(12) United States Patent
Sasaki et al.

(10) Patent No.: US 7,289,715 B2
(45) Date of Patent: Oct. 30, 2007

(54) OPTICAL FIBER HOLDING DEVICE AND METHOD FOR USING SAME

(75) Inventors: Katsumi Sasaki, Sakura (JP);
Yoshiharu Kanda, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/515,004

(22) Filed: Sep. 5, 2006

(65) Prior Publication Data
US 2007/0053648 A1   Mar. 8, 2007

(30) Foreign Application Priority Data
Sep. 6, 2005   (JP)   ............................ P2005-257701

(51) Int. Cl.
*G02B 6/00* (2006.01)

(52) U.S. Cl. ...................................... 385/137

(58) Field of Classification Search ........ 385/134–137, 385/52, 97
See application file for complete search history.

(56) References Cited

U.S. PATENT DOCUMENTS 6,299,361 B1 * 10/2001 Sasaki et al. ................. 385/59

FOREIGN PATENT DOCUMENTS

| JP | 01013505 A | * | 1/1989 |
| JP | 2002006167 A | * | 1/2002 |
| JP | 2003-014974 A | | 1/2003 |
| JP | 2004-004350 A | | 1/2004 |

* cited by examiner

*Primary Examiner*—Sarah Song
(74) *Attorney, Agent, or Firm*—Sughrue Mion Pllc.

(57) ABSTRACT

An optical fiber end part holding device includes a base providing a V-groove in which an optical fiber end part is mounted and a pressuring member providing a pair of inclined faces forming a V-shaped form that engages the V-groove and a level lower face that presses and applies pressure to the end of an optical fiber mounted in the V-groove. The pressuring member moves to press and apply pressure to the end part of the optical fiber, is able to rotate in the same direction as the longitudinal direction of the V-groove, and is constructed such that the width of the lower face gradually broadens from one end in the direction that is the longitudinal direction of the V-groove toward the other end.

10 Claims, 13 Drawing Sheets

OPTICAL FIBER HOLDING DEVICE AND METHOD FOR USING SAME

CROSS REFERENCE TO RELATED APPLICATIONS

This application claims priority from Japanese Patent Application No. P2005-257701, filed on Sep. 6, 2005; the entire contents of which are incorporated herein by reference.

BACKGROUND OF THE INVENTION

1. Field of the Invention

The present invention relates to a holding device for the end part of an optical fiber and a method for using the device, and more specifically, to an optical fiber end part holding device for determining the position of an optical fiber end part when optical fiber end parts are aligned in contact and joined by thermal welding using an optical fiber fusion splicer, and the method by which this is performed.

2. Description of the Related Art

In conventional technology, when joining optical fibers, a fusion connection method is used in which, after the ends of the optical fibers to be connected are aligned in contact, they are thermally welded together. In order to reduce connection loss occurring when optical fibers are connected, the axial centers of both optical fibers must be precisely matched.

To achieve this alignment, an optical fiber end part holding device 101 as shown in FIG. 1 is used, in which both optical fibers 103 to be joined are arranged in a V-groove 107 provided in a base 105. Further, a pressuring member 109 is used, the sloped faces of which form a V-shape, in order to fit into the V-groove 107. The axial centers of the optical fibers 103 are precisely matched as the optical fibers 103 are pressured into the V-groove 107 by the flat lower face 111 at the end part of the pressuring member 109. When this occurs the appropriate degree of gap S between the sloped face of the pressuring member 109 and the V-groove 107 can be maintained as the width W of the lower face 111 of the pressuring member 109 is matched to the size of the optical fibers 103.

There are a number of different types of optical fibers 103 that may be connected, the external diameters of which differ according to their use. A first holding method of the conventional art for holding optical fiber ends of optical fibers 103 having different external diameters in the lower part of the V-groove 107 involves changing the pressuring member 109.

For example, FIG. 1 shows the condition in which a large diameter optical fiber 103 is held by a pressuring member 109 the width W of the lower face 111 of which is broad, while FIG. 2 shows the condition in which a small diameter optical fiber 103 is held by a pressuring member 109 the width W of the lower face 111 of which is narrow. In this way the width W of the lower face 111 can be changed to match the external diameter of the optical fiber 103 by changing the pressuring member 109 and the optical fiber 103 can be definitively held in the lower part of the V-groove 107.

However if a small diameter optical fiber 103 is held by the holding mechanism for a large diameter fiber as that shown in FIG. 1, a gap T opens between the lower part of the V-groove 107 and the lower face 111 of the pressuring member 109 as shown in FIG. 3, thus the optical fiber 103 cannot be held at the bottom part of the V-groove 107.

Further, if a large diameter optical fiber 103 is held by the holding mechanism for a small diameter fiber as that shown in FIG. 2, the gap S between the sloped face of the pressuring member 109 and the sloped face of the V-groove 107 becomes large as shown in FIG. 4A, causing the pressuring member 109 to become displaced as shown in FIG. 4B or inclined as shown in FIG. 4C such that the optical fiber 103 can not be precisely held at the lower part of the V-groove 107. Accordingly, it is necessary in order to definitively hold optical fibers 103 having differing external diameters at the lower part of the V-groove 107, to change the pressuring member 109 to match the external diameter of the optical fiber 103.

A second example of conventional technology for an optical fiber end part holding device, such as that disclosed in Japanese Unexamined Patent Application Publication No. 2003-14974, does not involve changing the pressuring member, but provides a method for holding optical fibers having different external diameters at the lower part of a V-groove.

Referring to FIGS. 5A and 5B, a concave part 113 is provided in the center part of a V-groove 107 provided in a base 105, while a convex part 117 is provided in the center part of a fiber clamp 115 that provides a pressuring member, such that this convex part 117 fits together with the concave part of the V-groove 107. In this way, even when an optical fiber 103 is displaced from the center part of the V-groove 107, the convex part 117 of the fiber clamp 115 fits to the concave part 113 of the V-groove 107, pressing the optical fiber 103 to the lower part of the V-groove 107 such that the optical fiber 103 can be guided to move to the center of the V-groove 107 and held.

A third example of conventional technology for an optical fiber end part holding device, such as that disclosed in Japanese Unexamined Patent Application Publication No. 2004-4350 also, does not involve changing the pressuring member, but provides a method for holding optical fibers having different external diameters at the lower part of a V-groove.

As shown in FIG. 6, a part at the rear part of the V-groove 107 provided in the base 105 is formed at a different level such that the part at the rear part of the V-groove 107 is not as deep as the other part. There are two types of pressuring member for this arrangement, a fiber clamp 119 for a large diameter optical fiber held in the frontal part and a fiber clamp 121 for a smaller diameter optical fiber held in the rear part. These two types of clamp are constructed so as to be independently movable.

A problem that affects the first type of conventional optical fiber end part holding device arises when holding optical fibers 103 have differing external diameters at the lower part of the V-groove 107. In this case, a plurality of types of pressuring member 109 matching the external diameters of the optical fibers 103 must be arranged and work is required to change the pressuring member 109 as the external diameters of the optical fibers 103 change. Thus, a troublesome operation which extends the duration of work time involved must be performed when the optical fibers 103 are connected. Further, a large number of components are required in such a device leading to an increase in the cost of producing the device.

A problem that affects the second type of conventional optical fiber end part holding device is that the width of the lower face of the fiber clamp 115 must be sufficiently narrow for the smallest diameter optical fiber 103, in which case when handling a large diameter optical fiber 103, the fiber clamp 115 can easily drift as shown in FIG. 7A such that the optical fiber 103 cannot be held at the vertex part thereof.

Moreover, if the vertex part of the optical fiber 103 is not held, the optical fiber 103 may move upward.

Further, the depth of the V-groove 107 at the concave part 113 of the center part of the V-groove 107 must be shallow in order to hold a small diameter optical fiber 103. Thus, when holding a large diameter optical fiber 103 the optical fiber may move up, as shown in FIG. 7B, as it is not in contact with the V-groove 107 at the concave part 113 of the middle part of the V-groove 107, such that the optical fiber 103 becomes bent by the fiber clamp 115 and may sustain damage.

In this arrangement, if for example the small diameter is φ 125 µm then the maximum diameter that can be worked is 400 µm. However, optical fibers 103 actually have a diameter from φ 80 µm to 900 µm, thus it becomes necessary to provide a plurality of fiber clamps 115 or V-shaped grooves 107.

A problem that affects the third type of conventional optical fiber end part holding device is that when a large diameter optical fiber 103 is held at the frontal, deep V-groove 107 as shown in FIG. 8A, the width of the lower face of the fiber clamp 119 must be matched to the optical fiber 103 having the smallest diameter of the large diameter fibers, and the degree of instability in the holding of the fibers increases proportionally to the increase in the diameter of the optical fiber 103 being held, as shown in FIG. 8B.

Accordingly, when a series of fiber clamps 119 are arranged matching the respective diameters of the optical fibers 103 to be held, the holding parts become longer, the device itself becomes larger and the number of components increases causing a rise in costs.

When handling a small diameter optical fiber 103, as shown in FIG. 8C the fiber is held at the rear part, shallow V-groove 107 and the fiber clamp 121 only, and as the end part of the optical fiber 103 is not pressed at the lower part of the V-groove 107 the end part of the optical fiber 103 may move up.

Also, in the case of the second or third types of conventional optical fiber end part holding devices, the V-shaped grooves 107 for holding the optical fibers as well as the pressuring members are of complex shapes and constructions, resulting in increased production costs.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An aspect of the present invention provides an optical fiber end part holding device including a base providing a V-groove in which an optical fiber end part is mounted, and a pressuring member providing a pair of inclined faces forming a V-shape that engages the V-groove and a level lower face that presses and applies pressure to the end of an optical fiber mounted in the V-groove. The pressuring member can move as required to press and apply pressure to the end part of the optical fiber, is able to rotate in the same direction as the longitudinal direction of the V-groove, and is constructed such that the width of the lower face gradually broadens from one end in the direction that is the longitudinal direction of the V-groove toward the other end.

BRIEF DESCRIPTION OF THE DRAWINGS

The above and other aspects of the present invention will be more apparent from the following detailed description taken in conjunction with the accompanying drawings, in which.

DETAILED DESCRIPTION OF THE INVENTION

Figure 1:
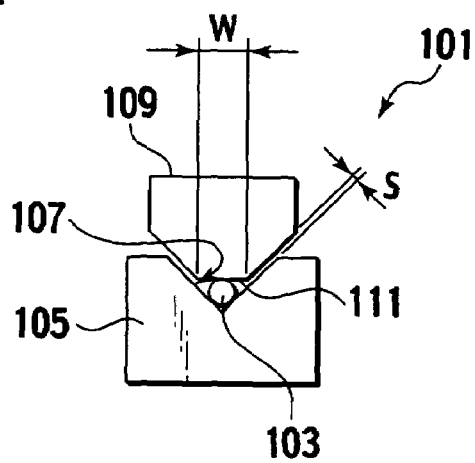
FIG. 1 is a longitudinal cross-sectional view of a first type of conventional art optical fiber end part holding device, illustrating the condition when a large diameter optical fiber is held.
Figure 2:
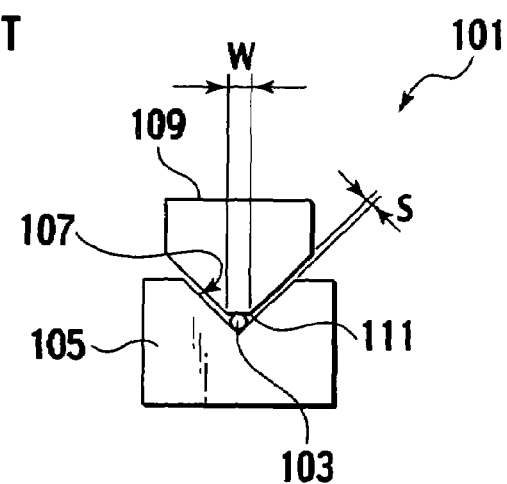
FIG. 2 is a longitudinal cross-sectional view of a condition when a small diameter optical fiber is held in a second type of conventional art optical fiber end part holding device.
Figure 3:
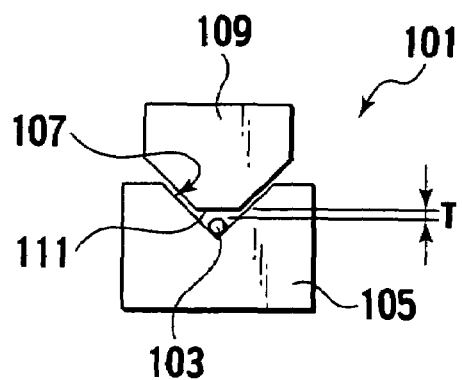
FIG. 3 is a longitudinal cross-sectional view of a condition when a small diameter optical fiber is held in a third type of conventional art optical fiber end part holding device.
Figure 4A:
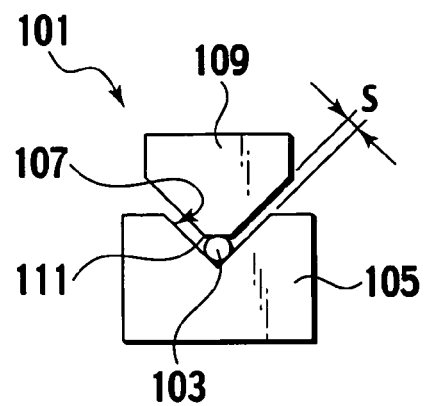
FIGS. 4A-4C are longitudinal cross-sectional views of unsatisfactory conditions arising when a large diameter optical fiber is held in the first type conventional art optical fiber end part holding device.
Figure 4B:
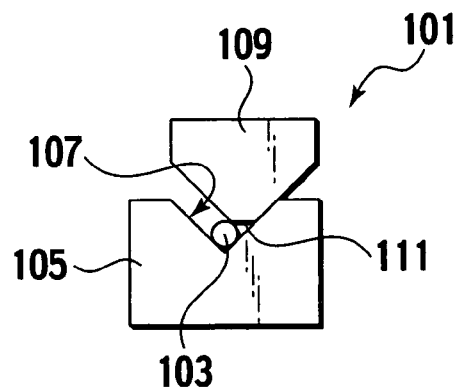
Figure 4C:
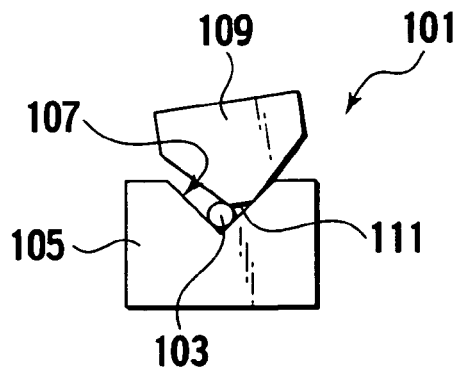
Figure 5A:
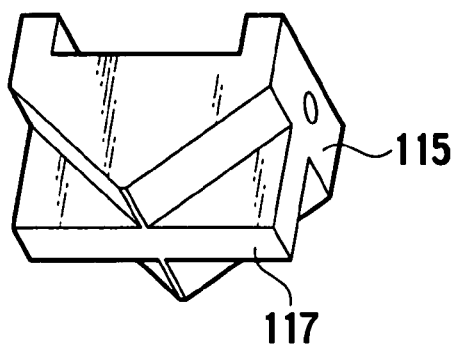
FIGS. 5A and 5B are perspective views illustrating the second type of conventional art optical fiber end part holding device.
Figure 5B:
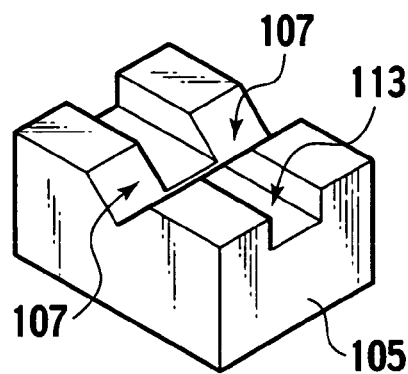
Figure 6A:
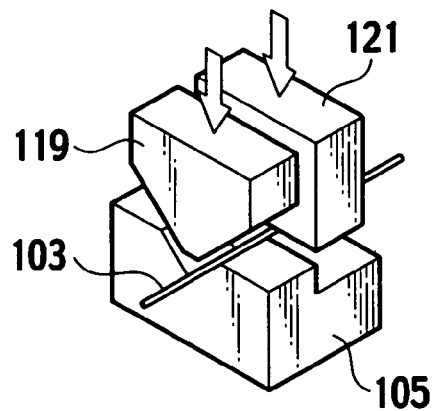
FIGS. 6A and 6B is a perspective view illustrating the third type of conventional art optical fiber end part holding device.
Figure 6B:
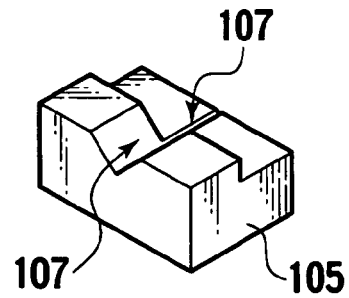
Figure 7A:
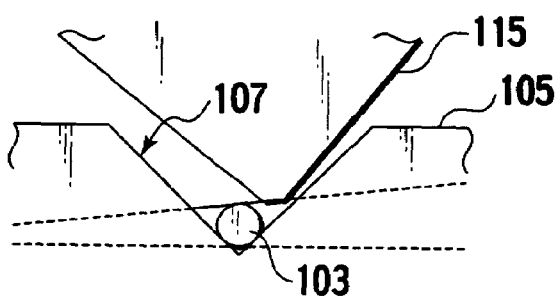
FIG. 7A is a longitudinal cross-sectional view of an unsatisfactory condition arising when a small diameter optical fiber is held by the second type of conventional art optical fiber end part holding device.
Figure 7B:
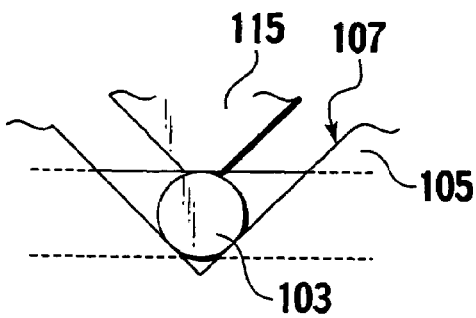
FIG. 7B is a longitudinal cross-sectional view of an unsatisfactory condition arising when a large diameter optical fiber is held by the third type of conventional art optical fiber end part holding device.
Figure 8A:
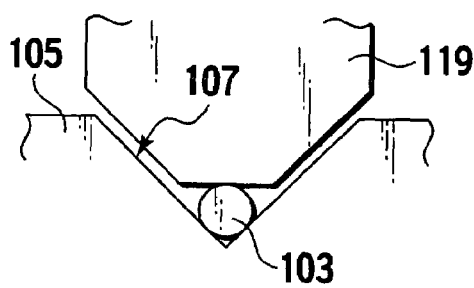
FIGS. 8A-8C are longitudinal cross-sectional views of unsatisfactory conditions arising when optical fibers are held by the third type of conventional art optical fiber end part holding device.
Figure 8B:
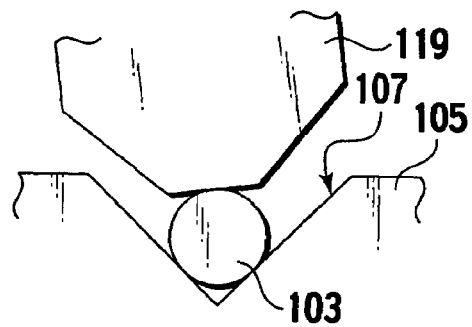
Figure 8C:
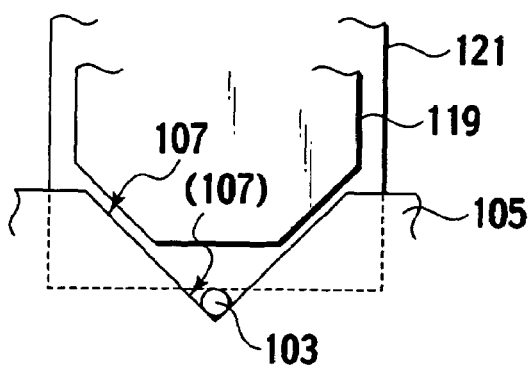

Various exemplary embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous details are set forth to provide a thorough understanding of the present invention. However, it will be obvious to those skilled in the art that the present invention may be practiced without such specific details.

The optical fiber end part holding device according to a first exemplary embodiment of the present invention is used when connecting optical fibers in an optical fiber fusion splicer that thermally fuses/welds optical fibers together after the ends of the optical fibers to be connected are aligned in contact. The optical fibers that can be processed by this invention may be fibers comprised of, for example, but not limited to, undressed optical fiber, optical fiber filaments, and coated optical fibers, referred to collectively hereinafter simply as "optical fiber".

Figure 22:
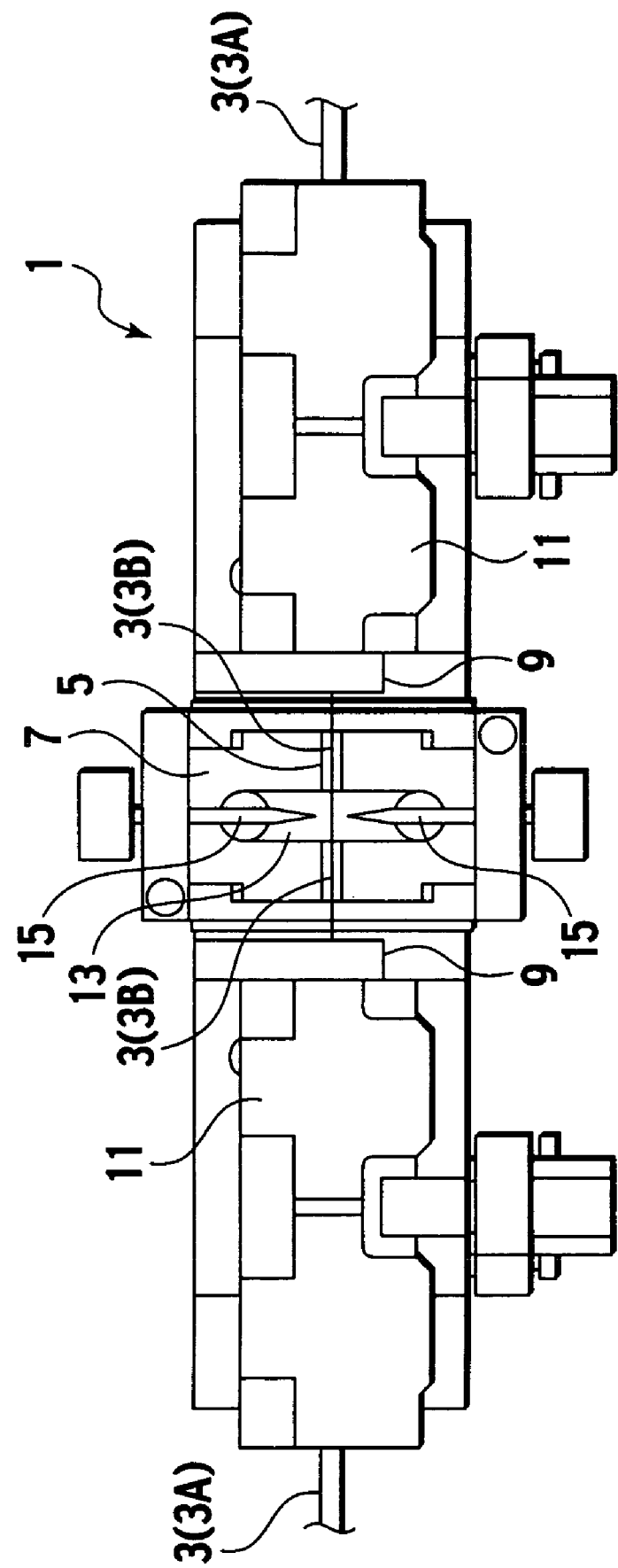
FIG. 22 is a plan view illustrating an optical fiber fusion splicer related to exemplary embodiments of the present invention.

Referring to FIG. 22, an optical fiber fusion splicer 1 provides a fiber aligning part 7 having a V-groove 5 for positioning a pair of optical fibers 3 such that their respective ends are mutually abutting, an optical fiber end part holding device 9, that positions and holds each optical fiber 3 from the pair of optical fibers 3 on each side of the fiber aligning part 7, and an optical fiber gripping part 11 for further gripping the optical fibers 3 at the rear parts thereof on the respective sides of the holding device 9.

For this exemplary embodiment, coated optical fibers 3A are used for the optical fibers 3, there being a sheath member removed at the end of these coated optical fibers 3A such that optical fibers 3B protrude without the sheath. The coated optical fiber 3A is gripped by the optical fiber gripping part 11 while the unsheathed optical fiber 3B is held by the holding device 9. A configuration in which the coated optical fiber 3A is gripped by the holding device 9 is also suitable. Hereinafter each of the coated optical fiber 3A and unsheathed optical fiber 3B are simply referred to as "optical fiber 3".

The fiber aligning part 7 is a substantially square shaped block having a horizontal groove 13 facing in the widthwise direction (the vertical direction in FIG. 22), in substantially the center in the left-to-right direction of this block in FIG. 22. On the upper surface of the block at both sides of this horizontal groove 13, an aligning V-groove 5 is provided for accommodating optical fibers 3 in the desired position in the frontward-rearward direction (the lateral direction in FIG. 22). The centers of each of the mutually opposing V-shaped grooves 5 at the upper surface of the block on both sides are arranged along a straight line.

At both sides of the horizontal groove 13 in the horizontal direction in FIG. 22, an optical fiber fusion means, for example, but not limited to, a pair of arc current discharge electrodes 15, are provided for fusing and connecting optical fibers 3 which abut each other in the aligning part 7.

Referring to FIGS. 9 to 12, the optical fiber end part holding device 9 related to the first exemplary embodiment of the present invention comprises a base 19 providing a V-groove 17 in which the end parts of optical fibers 3 are mounted, and a pressuring member 23 providing a flat lower face 21 for pressuring the end part of an optical fiber 3 mounted in the V-groove 17.

The base 19 is disposed so as to move freely vertically when driven by a motor device not shown in the drawing, such that the base 19 can operate when holding both unsheathed optical fibers 3B or optical fiber core wires 3A for the optical fibers 3.

Figure 9:
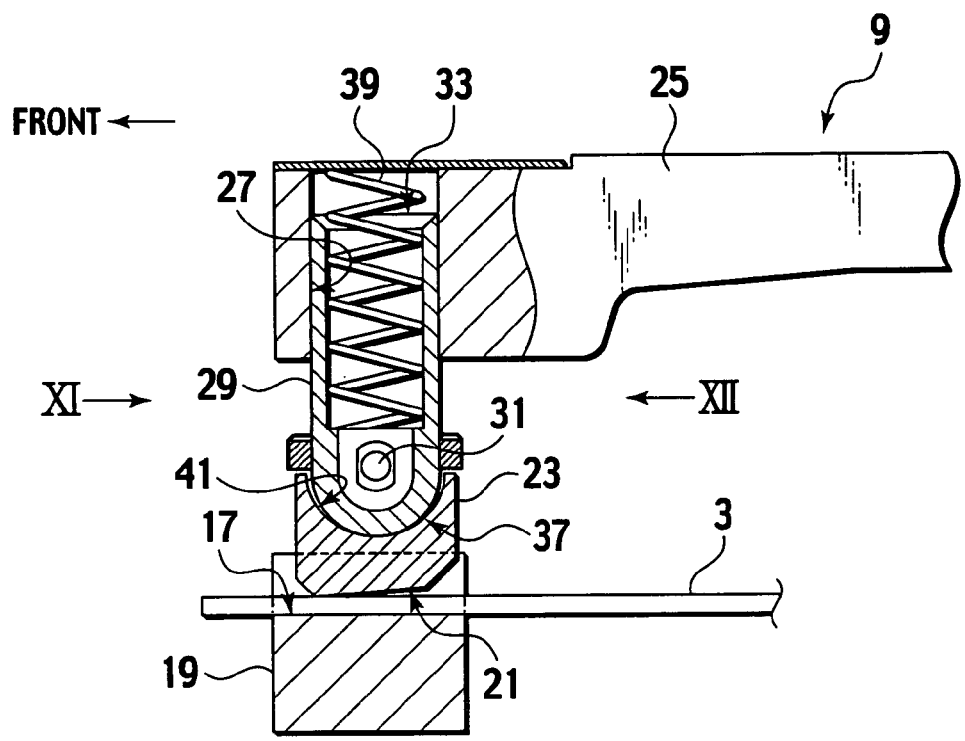
FIG. 9 illustrates an optical fiber end part holding device according to an exemplary embodiment of the present invention, providing a longitudinal cross-sectional view of a condition when a small diameter optical fiber is held.
Figure 10A:
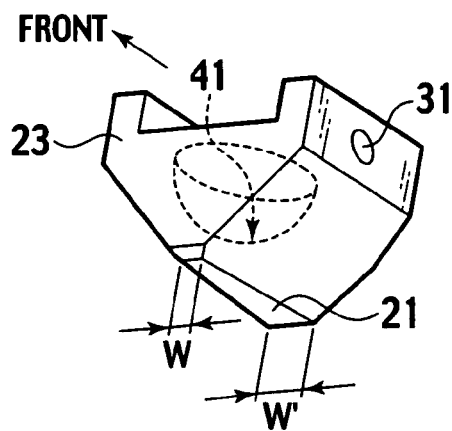
FIG. 10A is a perspective view of a pressuring member of FIG. 9.
Figure 10B:
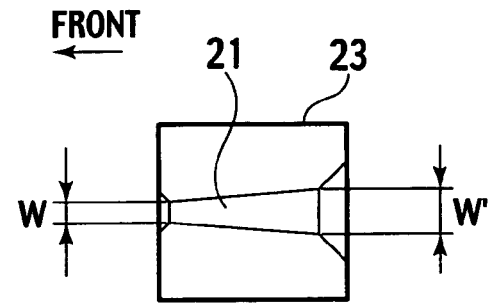
FIG. 10B is a bottom plan view of the pressuring member of FIG. 9.

The pressuring member 23 is arranged, as shown in FIG. 10A and FIG. 10B, such that the width of the lower face 21 broadens gradually from narrow width W to broad width W' from the side in the same direction as the lengthwise direction of the V-groove 17 (the left end in FIG. 10B) to the other side (the right side in FIG. 10B), moreover so as to be inclined in the direction that gradually increases the distance of the gap with the V-groove 17 in the direction in which the width of the lower face 21 broadens. In the case of this first embodiment, the narrow width W side of the pressuring member 23 is positioned at the front side (the left side in FIG. 9) while the broad width W' side is positioned at the rear (the right side in FIG. 9).

A freely rotatable clamp arm 25 is installed at the base of the optical fiber fusion splicer 1, providing a mobile member, while a compression shaft 29 comprising part of the mobile member, is supported so as to be able to slide freely in the vertical direction, in a sliding opening part 27 provided at the end part of the clamp arm 25. The pressuring member 23 is suspended from the compression shaft 29 via a spindle 31.

The upper part of the compression shaft 29 forms a sliding surface that slides in the sliding opening 27, while the top part of the compression shaft 29 is a cylindrical form having an opening 33, with a flange 35 (FIG. 12) that contacts the top end surface of the sliding opening 27, being provided around the external circumference of the top end part of the compression shaft 29 and a convex form spherical surface 37 being formed at the lower end part of the compression shaft 29. The compression shaft 29 remains in a state of being pressured downward by a compression spring 39 disposed between the upper wall surface of the clamp arm 25 and inside the cylinder of the compression shaft 29, this downward pressuring force being stopped as the flange 35 comes in contact with the top end surface of the sliding opening 27.

The pressuring member 23 is of a block form, the longitudinal cross-section of which is V-shaped. The flat lower face 21 is disposed at the end (the lower end in FIG. 10A)

of the V-shaped form, while at the upper end face in FIG. 10A, a concave form spherical surface 41 is provided, that engages the convex form spherical surface 37 of the compression shaft 29. As shown in FIG. 9, the concave form spherical surface 41 forms a radius of curvature somewhat larger than the convex form spherical surface 37.

The pressuring member 23 is suspended so as to rotate freely in the longitudinal direction of the V-groove 17, centered around the spindle 31, with the concave form spherical surface 41 in the condition of engagement with the convex form spherical surface 37 of the compression shaft 29.

Accordingly, the pressuring member 23 in the condition prior to pressing an optical fiber 3, remains in a state pressured downward in the direction by which the sloped faces on both sides of the pressuring member 23 engage the V-groove 17 via the region of contact of the convex form spherical surface 37 of the compression shaft 29 and the concave form spherical surface 41 of the pressuring member 23, by the dead weight of the pressuring member 23 and the compression spring 39.

The pressuring member 23 is biased by a biasing means such as a coil spring provided on the shaft 29 so as to be inclined in the direction by which the distance of the gap between itself and the V-groove 17 gradually separates toward the direction by which the width of the lower face 21 broadens, in a condition suspended via the spindle 31 from the bottom end part of the compression shaft 29. This suspended condition is the unclamped condition prior to the pressuring member 23 pressuring an optical fiber 3 mounted in the V-groove 17. In this exemplary embodiment, the frontal view of the pressuring member 23 is such that the angle of the V-shaped form is at a same 90° angle as an angle of opening θ of the V-groove 17.

In accordance with the above described configuration, if the clamp arm 25 is rotated and the end part of the clamp arm 25 lowers in relation to the V-groove 17 of the base 19, the lower face 21 of the pressuring member 23 or the inclined faces on both sides of the V-shape form contact the sloped faces on both sides of the V-groove 17. As the clamp arm 25 depresses further against the force of the compression spring 39, the compression shaft 29 is compressed by the force of the compression spring 39 such that the pressuring member 23 compresses in the V-groove 17 downward via the region of contact of the convex form spherical surface 37 of the compression shaft 29 and the concave form spherical surface 41 of the pressuring member 23.

According to the above described configuration, the pressuring member 23 changes from the narrow width W to the broader width W' as the width of the lower face 21 that presses the optical fiber 3 is narrow at the front end thereof and broader at the rear end thereof, such that optical fibers 3 of different external diameters can be definitively held in the lower part of the V-groove 17 without requiring that the pressuring member 23 be changed.

Figure 11:
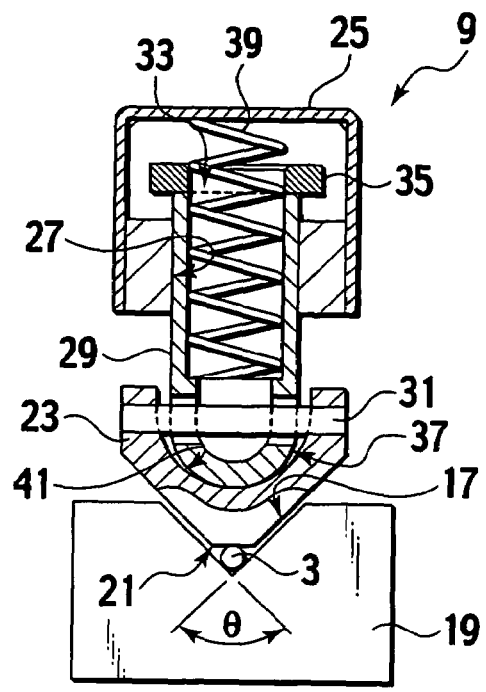
FIG. 11 is a partial, side view XI of FIG. 9.
Figure 12:
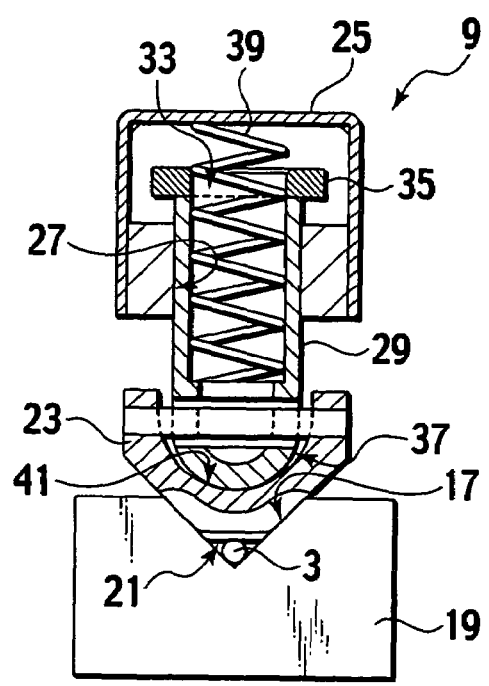
FIG. 12 is a partial, side view XII of FIG. 9.
Figure 13:
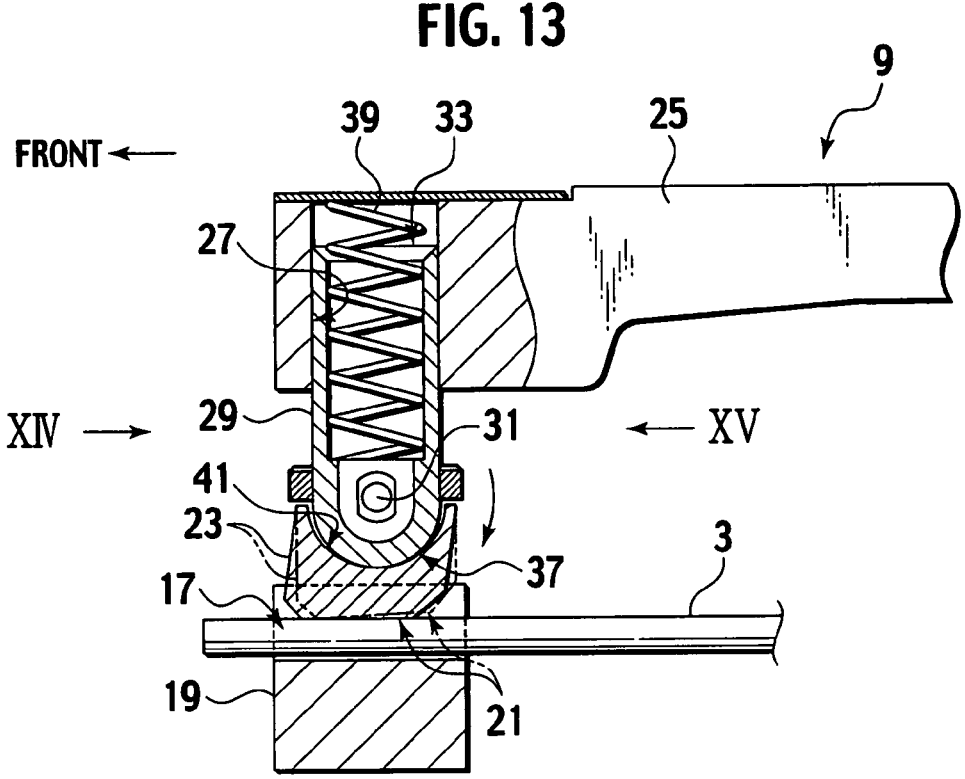
FIG. 13 is a longitudinal cross-sectional view of the condition arising when a small diameter optical fiber is held by an optical fiber end part holding device according to an embodiment of the present invention.
Figure 14:
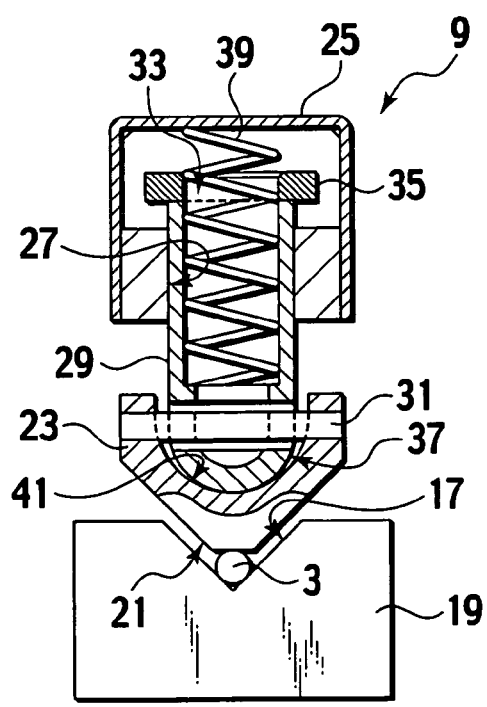
FIG. 14 is a partial side view along the line of view XIV of FIG. 13.
Figure 15:
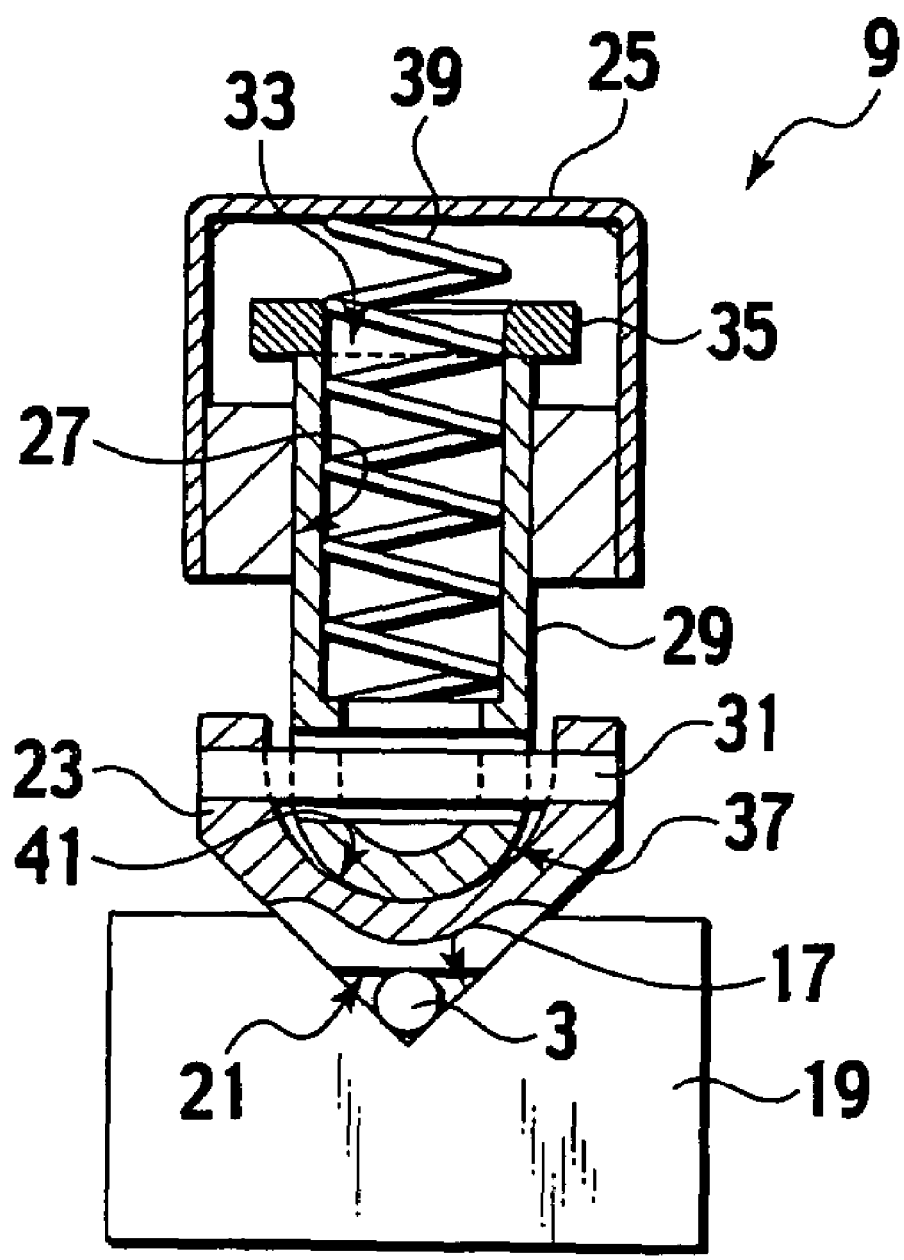
FIG. 15 is a partial side view along the line of view XV of FIG. 13.

That is, when a small diameter optical fiber 3 is held, as shown in FIGS. 9, 11 and 12, the optical fiber 3 is pressed at the lower face 21 at the narrow width W, front end side of the pressuring member 23 while at the lower face 21 at the broader width W', rear end side of the pressuring member 23, the optical fiber 3 is not pressed. On the other hand, when a large diameter optical fiber 3 is held, as shown in FIGS. 13, 14 and 15, the optical fiber 3 is pressed from the lower face 21 at the broad width W' of the pressuring member 23 to the lower face 21 at the narrow width W of the pressuring member 23.

Figure 16A:
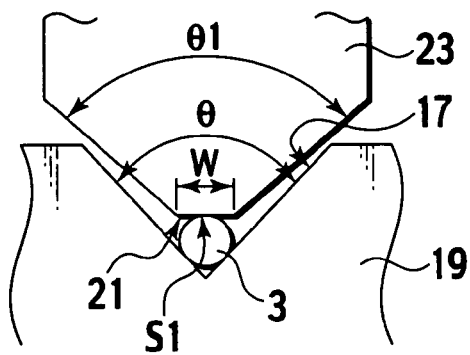
FIGS. 16A-16D are explanatory views illustrating a condition arising when a small diameter optical fiber is held by an optical fiber end part holding device according to an exemplary embodiment of the present invention.
Figure 16B:
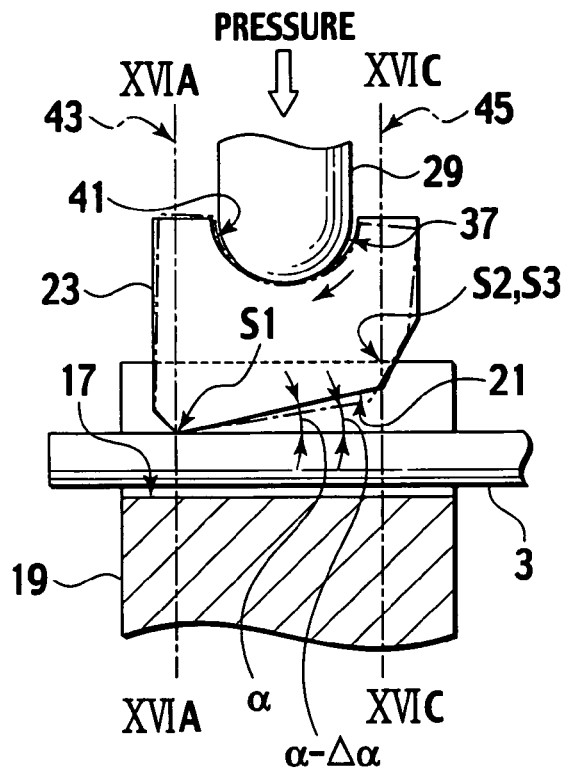

With reference to FIGS. 16A-16D, when a small diameter optical fiber 3 is held, the optical fiber 3 is mounted in the lower part of the V-groove 17 as illustrated in FIG. 9 and FIG. 16B. With the pressuring member 23 suspended from the compression shaft 29, the angle of inclination formed between the lower face of the pressuring member 23 and the horizontal plane is α.

Figure 16C:
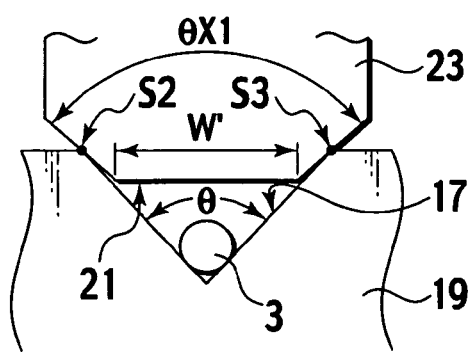

As the pressuring member 23 is lowered on to the optical fiber 3, as illustrated in FIG. 16A and FIG. 16B, the lower face 21 at the narrow width W front end side of the pressuring member 23 contacts the contact point S1 of the optical fiber 3, as shown by chain lines in FIG. 16B, the pressuring member 23 rotates slightly in relation to the compression shaft 29 in the clockwise direction of FIG. 16B, and the angle of inclination formed between the lower face 21 of the pressuring member 23 and the optical fiber 3 changes ($\alpha-\Delta\alpha$). As shown in FIG. 16C, the inclined faces of the V-shaped form of the broad width W' of the lower face 21 at the rear side of the pressuring member 23 make contact with both shoulders S2 and S3 at the upper end of the V-groove 17.

The angle θ1 of the V-shaped form of the pressuring member 23 over the plane 43 (cross-section of the line XVIA-XVIA) orthogonal in relation to the longitudinal direction of the V-groove 17 through the contact point S1 of the optical fiber 3, forms an angle ($\theta 1 > \theta = 90°$) greater than θ only to the extent by which the pressuring member 23 rotates in relation to the compression shaft 29, as shown in FIG. 16B. In the same manner, the angle θX1 of the V-shaped form of the pressuring member 23 over the plane 45 (cross-section of the line XVIC-XVIC) orthogonal in relation to the longitudinal direction of the V-groove 17 through both shoulders S2 and S3 of the upper end of the V-groove 17, forms an angle ($\theta X1 > \theta 1 > \theta = 90°$) greater than θ only to the extent by which the pressuring member 23 rotates in relation to the compression shaft 29, as shown in FIG. 16C.

Figure 16D:
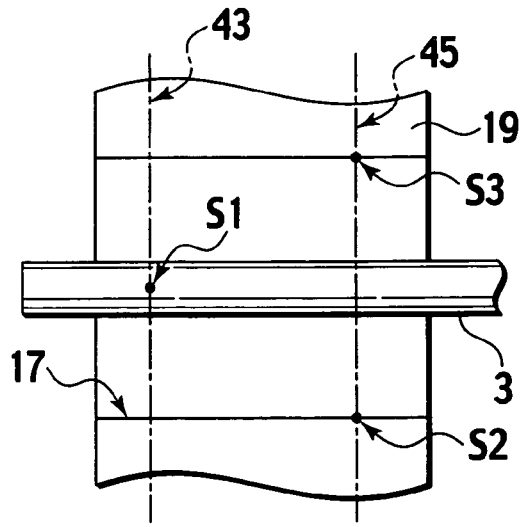

The inclined faces at the rear end side of the pressuring member 23 come into contact with both shoulders S2 and S3 at the upper end of the V-groove 17, and as shown in FIG. 16D, the pressuring member 23 pressures the optical fiber 3 mounted in the V-groove 17 at the three points of support S1, S2 and S3.

Accordingly, the optical fiber 3 is pressed by the lower face 21 of the narrow width W at the end part in the frontal direction of the pressuring member 23, while at the lower face 21 of the broader width W' at the rear end side of the pressuring member 23 the optical fiber 3 is not pressured. That is to say, the sloped faces on both sides of the V-shaped form of the rear end side of the pressuring member 23 come into contact with both shoulders S2 and S3 of the upper end of the V-groove 17, such that the lower face 21 at the rear end side of the pressuring member 23 does not reach the optical fiber 3 and therefore does not press the optical fiber 3.

The middle portion of the front end and the rear end of the pressuring member 23 is pressured in the direction of the V-groove 17 by the compression shaft 29, therefore, the sloped faces at both sides of the V-shaped form of the rear end side of the pressuring member 23 definitively contact both shoulders S2 and S3 of the upper end of the V-groove 17. Thus, the lower face 21 of the pressuring member 23 is positioned in the center in the widthwise direction of the V-shaped form of the V-groove 17. As a result, the lower face 21 of the narrow width W of the front end side of the pressuring member 23 also is positioned in the center in the widthwise direction of the V-shaped form of the V-groove 17, such that the contact point S1 of the optical fiber 3 is pressed, and the optical fiber 3 is pressed and held definitively at the lower part of the V-groove 17.

The case when a medium sized diameter optical fiber 3 is held will now be described with reference to FIGS. 17A-17D.

Figure 17A:
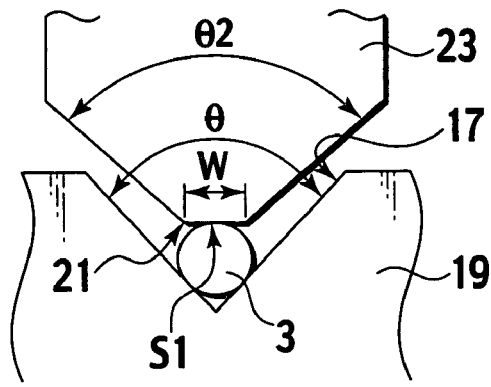
FIGS. 17A-17D are explanatory views illustrating a condition arising when a medium-size diameter optical fiber is held by an optical fiber end part holding device according to an exemplary embodiment of the present invention.
Figure 17B:
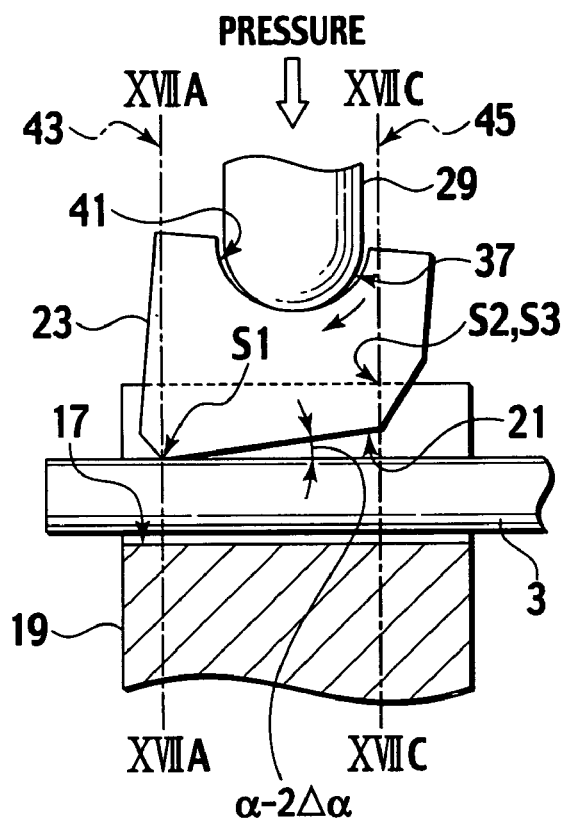
Figure 17C:
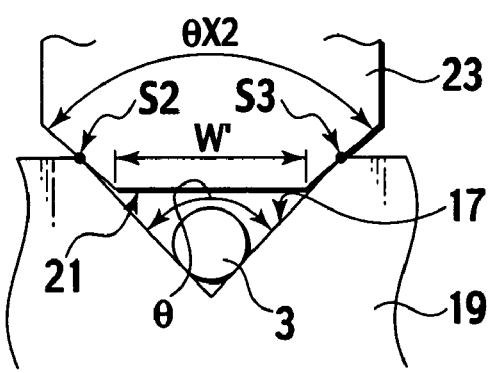

When a medium sized diameter optical fiber 3 is mounted in the lower part of the V-groove 17 and the pressuring member 23 is lowered over the optical fiber 3, the lower face 21 of the narrow width W of the front side of the pressuring member 23 comes into contact with the contact point S1 of the optical fiber 3 and the pressuring member 23 rotates, in relation to the compression shaft 29, in the clockwise direction in FIG. 17B. Here, the height of the contact point S1 of the optical fiber 3 is higher than in the above described case applying of the small diameter optical fiber 3. Thus, the pressuring member 23 rotates more substantially than in the case of the small diameter optical fiber 3. The angle of inclination between the lower face 21 of the pressuring member 23 and the optical fiber 3 is smaller, for example, changing to α–2Δα. As shown in FIG. 17C, the sloped faces of the V-shape form of the broad width W' of the lower face 21 at the rear end side of the pressuring member 23 then comes into contact with both shoulders S2 and S3 at the upper end of the V-groove 17.

The angle θX2 of the V-shaped form of the pressuring member 23 over the plane 45 (cross-section of the line XVIIC-XVIIC) orthogonal in relation to the longitudinal direction of the V-groove 17 through both shoulders S2 and S3 of the upper end of the V-groove 17, forms an angle θ2 (θX2>θ=90°) that is larger in proportion to the amount of rotation of the pressuring member 23 in relation to the compression shaft 29, as shown in FIG. 17C. Note that in the same manner, the angle of inclination of the V-shaped form of the pressuring member 23 over the plane 43 (cross-section of the line XVIIA-XVIIA) orthogonal in relation to the longitudinal direction of the V-groove 17 through the contact point S1 of the optical fiber 3, becomes θ2 as shown in FIG. 17A.

Figure 17D:
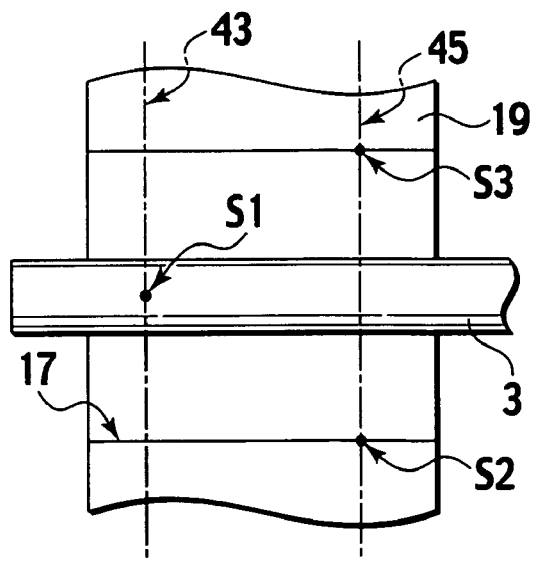

Accordingly, as shown in FIG. 17D, in the case of a medium sized diameter optical fiber 3, in the same manner as applies to the small diameter optical fiber 3 described above, the pressuring member 23 comes to pressure the optical fiber 3 mounted in the V-groove 17 at the three points of support S1, S2 and S3. That is to say, as the lower face 21 of the narrow width W of the frontal side of the pressuring member 23 is positioned in the center in the widthwise direction of the V-shaped form of the V-groove 17, the optical fiber 3 comes to be pressured at contact point S1 and the optical fiber 3 is pressed and held definitively at the lower part of the V-groove 17.

Next, the case when a large diameter optical fiber 3 is held will be described with reference to FIGS. 13-15 and 18A and 18D.

Figure 18A:
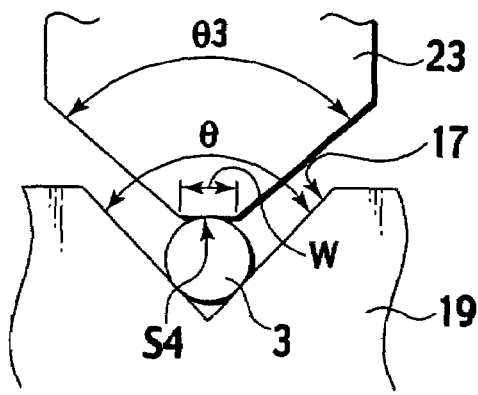
FIGS. 18A-18D are explanatory views illustrating a condition arising when a large diameter optical fiber is held by an optical fiber end part holding device according to an exemplary embodiment of the present invention.
Figure 18B:
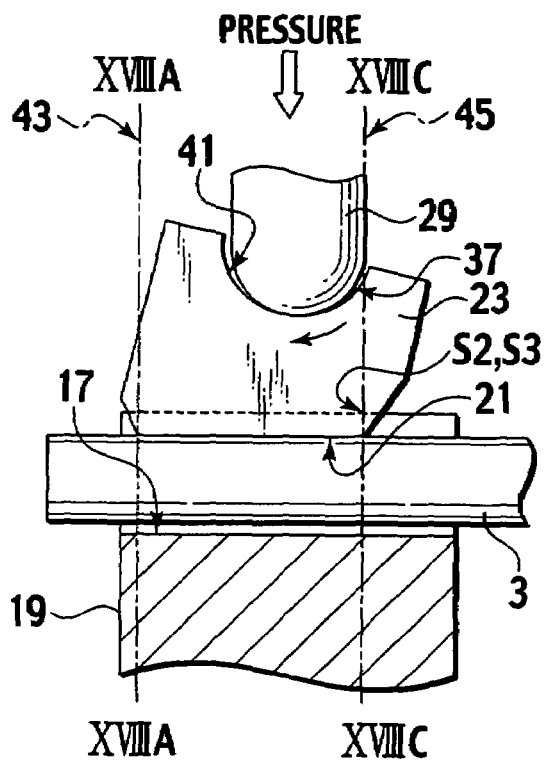

When a large diameter optical fiber 3 is held, as shown in FIG. 13 and FIG. 18B, the optical fiber 3 is mounted in the lower part of the V-groove 17. The pressuring member 23 is lowered over the optical fiber 3 and the pressuring member 23 rotates in the clockwise direction centered around the spindle 31. As the height of the contact point of the optical fiber 3 is higher than in the above described case applying to the medium sized diameter optical fiber 3, the rotation of the pressuring member 23 is greater than in that case, and the angle of inclination between the lower face 21 of the pressuring member 23 and the optical fiber 3 changes to 0°.

Figure 18C:
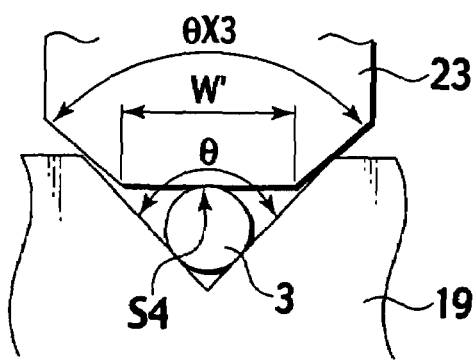

The angle θ3 of the V-shaped form of the pressuring member 23 over the plane 43 (cross-section of the line XVIIA-XVIIA) orthogonal in relation to the longitudinal direction of the V-groove 17 through the lower face 21 of the narrow width W at the frontal side of the pressuring member 23, forms an angle θ3 (θ3>θ=90°) that is larger in proportion to the amount of rotation of the pressuring member 23 in relation to the compression shaft 29, as shown in FIG. 18A. In the same manner, the angle of the V-shaped form of the pressuring member 23 over the plane 45 (cross-section of the line XVIIIC-XVIIIC) orthogonal in relation to the longitudinal direction of the V-groove 17 through the lower face 21 of the broader width W' at the rear side of the pressuring member 23 becomes OX3 as shown in FIG. 18C. At this time, the inclined faces of the V-shaped form of the broader width W' of the lower face 21 at the rear side of the pressuring member 23 are not in contact with both shoulders of the top part of the V-groove 17 and a gap opens therebetween.

Figure 18D:
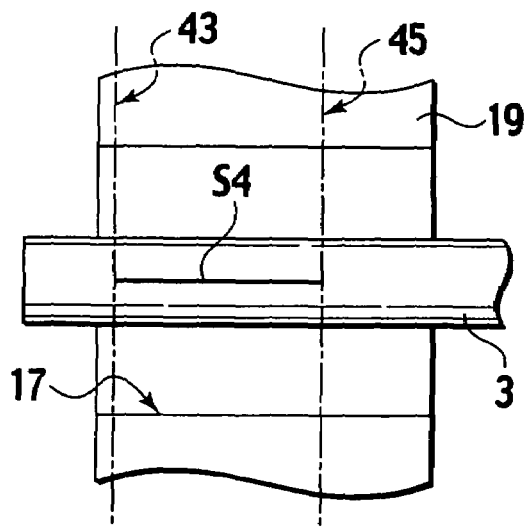

Accordingly, as shown by the unbroken line in FIG. 13 and by FIGS. 18B and 18D, the point of contact on the optical fiber 3 which is pressured runs the length of the lower face 21 from the front end to the rear end of the pressuring member 23, indicated by the straight-line S4. The broad width W' of the lower face 21 at the rear side of the pressuring member 23 being wider than the narrow width W of the lower face 21 at the front side of the pressuring member 23, even if for example, the pressuring member 23 is horizontally displaced and the inclined faces of the pressuring member 23 are positioned such that there is contact with the shoulder on one side of the V-groove 17 while a gap opens on the side of the other shoulder, the optical fiber 3 can be pressed and held definitively at the lower part of the V-groove 17.

From the above, it follows that if, for example, the volume change from the narrow width W of the lower face 21 of the pressuring member 23 to the broader width W' is set such that the diameter of a large diameter optical fiber 3 is above 400 μm, the diameter D of a small optical fiber 3 and a medium-size diameter optical fiber 3 is 80-400 μm (D<400 μm), and the optical fiber 3 is pressured at the supporting points S1, S2 and S3 as above, while a large diameter optical fiber 3 having a diameter above 400 μm (D>400 μm) the fiber is pressured at straight-line S4.

Further, this volume change can be set such that the diameter of a large diameter optical fiber 3 is not less than 500 μm, not less than 600 μm or greater still, and the angle of inclination α in relation to the level face of the lower face 21 of the pressuring member 23 can be increased in line with the increase in this setting, enabling the width W' of the lower face 21 of the rear side of the pressuring member 23 to be made larger.

According to the exemplary embodiments of the present invention it is not necessary to have a plurality of different types of pressuring member 23 matched to the sizes of the external diameters of different optical fibers 3 as required by the conventional technology, in order to hold optical fibers 3 having different external diameters at the lower part of the V-groove 17. Moreover, as there is no necessity for a pressuring member 23 exchange operation to be performed as the diameter of the optical fiber 3 changes, the preparation work required when connecting optical fibers 3 is simplified.

Further, the present invention enables production costs to be lowered as the shape and structure of the pressuring member 23 and the V-groove 17 that holds the optical fiber 3 are not complex.

An optical fiber end part holding device 9 related to a second exemplary embodiment of the present invention will now be described with reference to the drawings.

The optical fiber end part holding device 9 according to this second exemplary embodiment is similar to the structure of the first exemplary embodiment. Accordingly, the description is provided using the same reference symbols as apply with respect to the first embodiment. A point of difference is that the width of the lower face 21 of the pressuring member 23 is determined as the front end side being the broader width W', while the rear end side is the narrow width W.

Figure 19A:
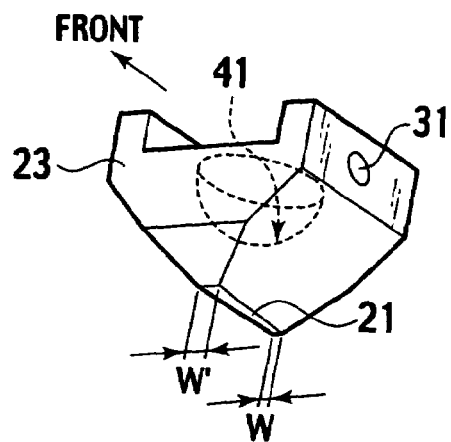
FIG. 19A is a perspective view of a pressuring member of an optical fiber end part holding device according to a second exemplary embodiment of the present invention.
Figure 19B:
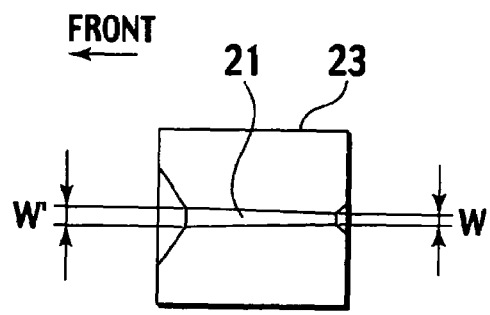
FIG. 19B is a bottom plan view of the pressuring member of an optical fiber end part holding device according to the second exemplary embodiment of the present invention.

That is, as shown in FIGS. 19A and 19B, by providing a form in which the width of the lower face 21 of the pressuring member 23 is broader at the front end side and narrower at the rear end side, optical fibers 3 of different external diameters can be definitively held in the lower part of the V-groove 17 without requiring that the pressuring member 23 be changed.

Figure 20:
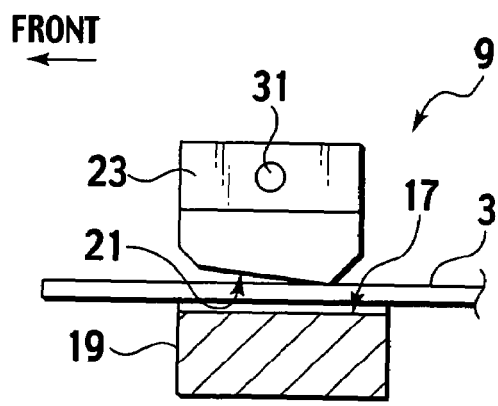
FIG. 20 illustrates an optical fiber end part holding device according to the second exemplary embodiment of the present invention, providing a longitudinal cross-section view of the condition of the pressuring member when a small diameter optical fiber is held.
Figure 21:
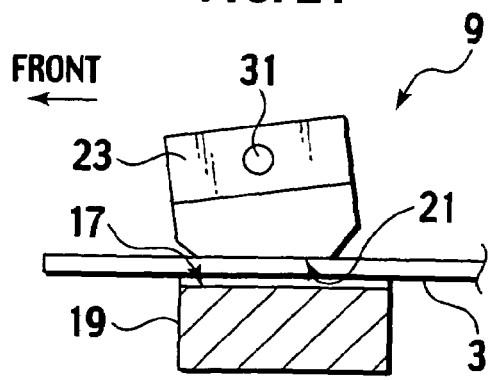
FIG. 21 illustrates an optical fiber end part holding device according to the second exemplary embodiment of the present invention, providing a longitudinal cross-sectional view of the pressuring member when a large diameter optical fiber is held.

Accordingly, when a small diameter optical fiber 3 is held, as shown in FIG. 20, the optical fiber 3 is pressured by the lower face 21 of the narrow width W at the rear end side of the pressuring member 23 but is not pressured by the lower face 21 at the broad width W' at the front end side of the pressuring member 23. On the other hand, when a large diameter optical fiber 3 is held, as shown in FIG. 21, the optical fiber 3 is pressed in a straight line along the entire length from the lower face 21 of the broader side W' at the front side of the pressuring member 23 to the lower face 21 of the narrow width W. That is, the operation and effects are substantially the same as that realized by the first embodiment. Accordingly a detailed explanation is omitted here.

In the above described first and second embodiments, the lower face 21 of the pressuring member 23 is set in advance such that the angle of inclination $\alpha$ in relation to the plane of the V-groove 17 is formed. However, it is also suitable for the lower face 21 to not have this angle of inclination $\alpha$. That is, even if the lower face 21 of the pressuring member 23 is set in advance to be parallel in relation to the plane of the V-groove 17 when a small diameter optical fiber 3 is pressured by the pressuring member 23, the pressuring member 23 rotates until the lower face 21 of the pressuring member 23 is in contact with the optical fiber 3. Finally, with the angle of inclination at $\alpha-\Delta\alpha$ as shown in FIG. 16B, the optical fiber 3 is pressed. In other respects, the operation of the second embodiment of the present invention is the same as that according to the first embodiment.

What is claimed is:

1. An optical fiber holding device comprising:
    a base comprising a V-groove in which an optical fiber end part is mounted; and
    a pressuring member comprising a pair of inclined faces forming a V-shaped that engages the V-groove, and a substantially flat lower face,
    wherein the pressuring member is constructed such that a width of the lower face gradually broadens from a first end to a second end in a longitudinal direction of the V-groove, moves to press and maintain pressure to an end part of an optical fiber mounted in the V-groove, and rotates in a same direction as a longitudinal direction of the V-groove.

2. The optical fiber holding device according to claim 1 wherein the pressuring member is inclined such that a distance between the pressuring member and the V-groove in a direction in which the broadening width of the lower face increases.

3. A method for holding an optical fiber using an optical fiber holding device comprising a base which comprises a V-groove, and a pressuring member comprising a pair of inclined faces forming a V-shape that engage the V-groove and a substantially flat lower face constructed with a gradually broadening width from a first end to a second end in a longitudinal direction of the V-groove, the method comprising:
    mounting end parts of optical fibers in the V-groove of the base;
    rotating the pressuring member in the longitudinal direction of the V-groove; and
    pressing and maintaining pressure to the end parts of the optical fibers with the lower face of the pressuring member.

4. The method of claim 3 wherein the pressing and maintaining pressure to the end parts of the optical fibers with the lower face of the pressuring member further comprises, in the case of a large diameter optical fiber, holding the end part of the optical fiber with the lower face of at least the broader width side of the pressuring member.

5. The method of claim 3 wherein the pressing and maintaining pressure to the end parts of the optical fibers with the lower face of the pressuring member further comprises holding the end part of the optical fiber with the lower face of at least the narrow width side of the pressuring member when a diameter of the optical fiber is less than a diameter of a large diameter optical fiber.

6. A method for holding an optical fiber using an optical fiber holding device comprising a base which comprises a V-groove, and a pressuring member comprising a pair of inclined faces forming a V-shape that engage the V-groove and a substantially flat lower face constructed with a gradually broadening width from a first end to a second end in a longitudinal direction of the V-groove, the method comprising:
    mounting an optical fiber having a predetermined diameter in the V-groove;
    pressing and maintaining pressure with the lower face of the pressuring member to set the broad width of the lower face of the pressuring member so as to make contact with the diameter of the optical fiber.

7. The method of claim 6 wherein the pressing and maintaining pressure with the lower face of the pressuring member further comprises applying pressure at the point at which contact is made with the optical fiber by the lower face of the narrow width side of the pressuring member and at the two points of both shoulders at the top part of the V-groove via the inclined faces of the V-shaped form of the broader width side of the pressuring member when the diameter of the optical fiber is less than the predetermined diameter.

8. The method of claim 6 wherein the pressing and maintaining pressure with the lower face of the pressuring member further comprises applying pressure at the region of contact of a line at which contact is made to the optical fiber in the longitudinal direction of the lower face of the pressuring member when the diameter of the optical fiber is equal to or greater than the predetermined diameter.

9. The method for holding an optical fiber according to claim 3, wherein the pressuring member is inclined, such that a distance between the pressuring member and the V-groove in a direction of the broadening of the width of the lower face increases from a first end to a second end in a longitudinal direction.

10. The method for holding an optical fiber according to claim 6, wherein the pressuring member is inclined in advance, such that a distance between the pressuring member and the V-groove in a direction of the broadening of the width of the lower face increases from a first end to a second end in a longitudinal direction.

* * * * *